July 8, 1952 C. B. DOTY 2,602,691
LATCH FOR PIVOTED CONVERTIBLE SEATS FOR VEHICLES
Filed June 10, 1947 3 Sheets-Sheet 3
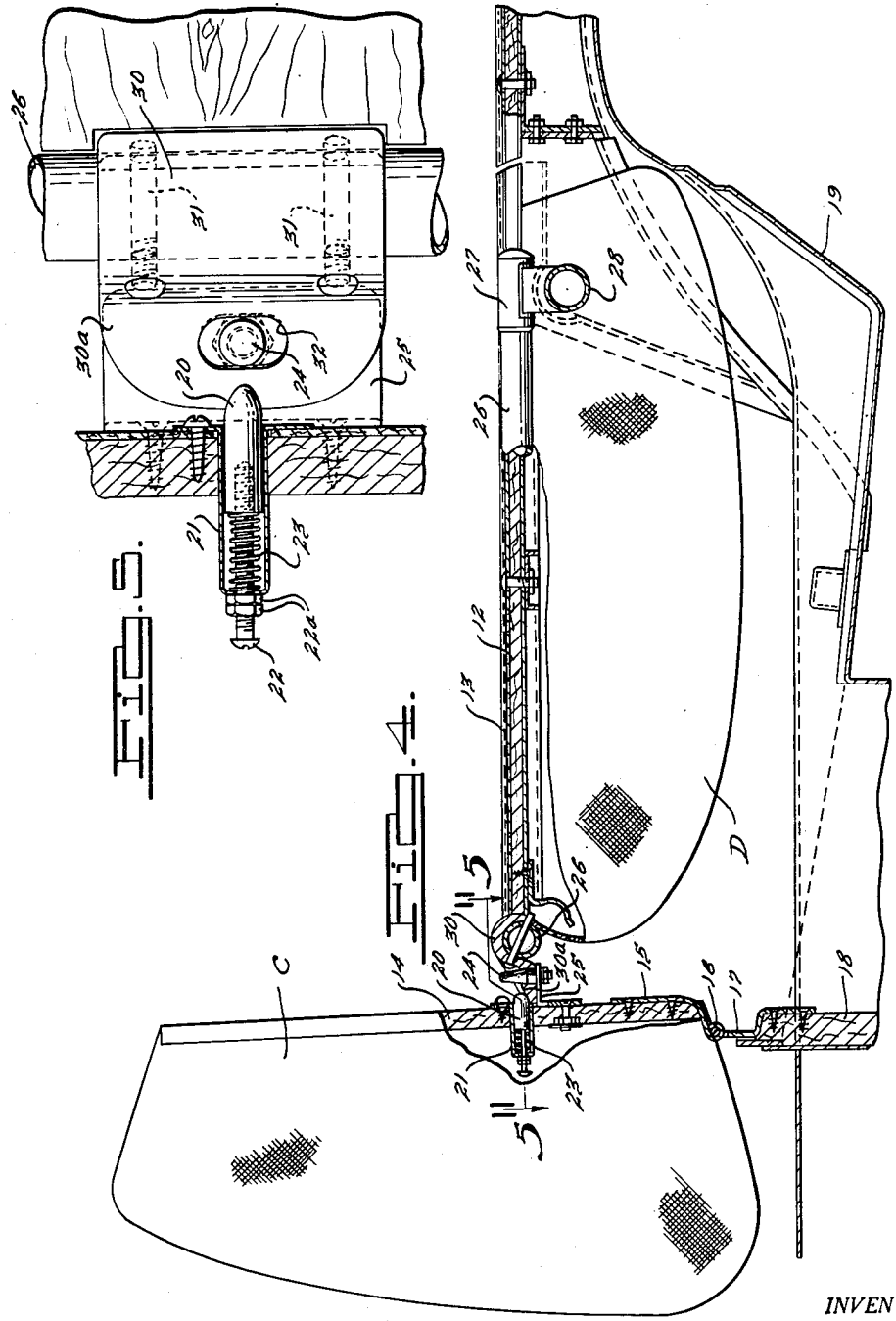
INVENTOR.
Clifford B. Doty.
BY
Elmer Jamison Gray
ATTORNEY.

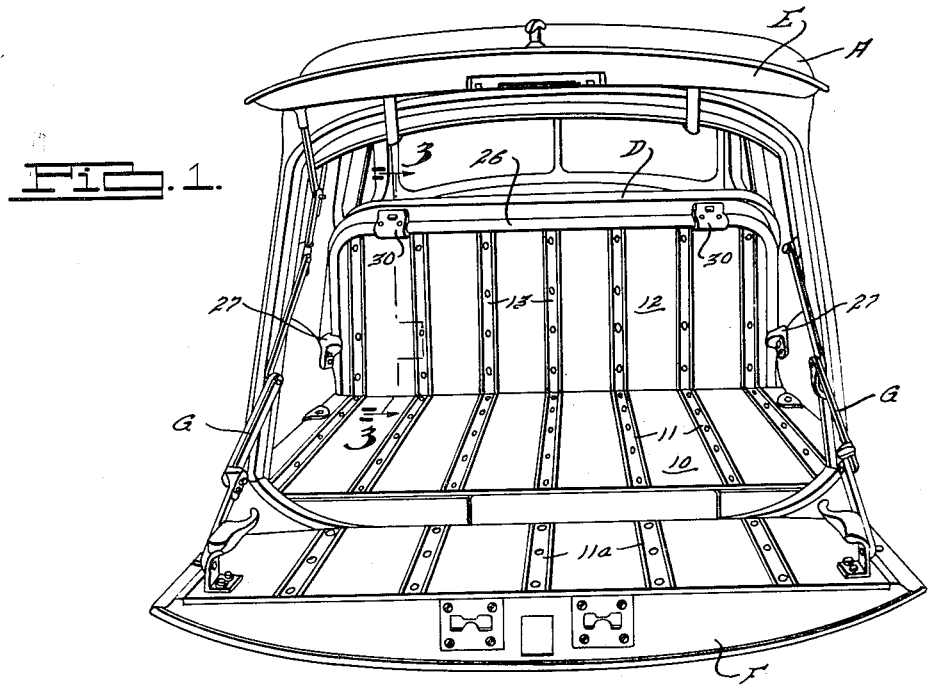
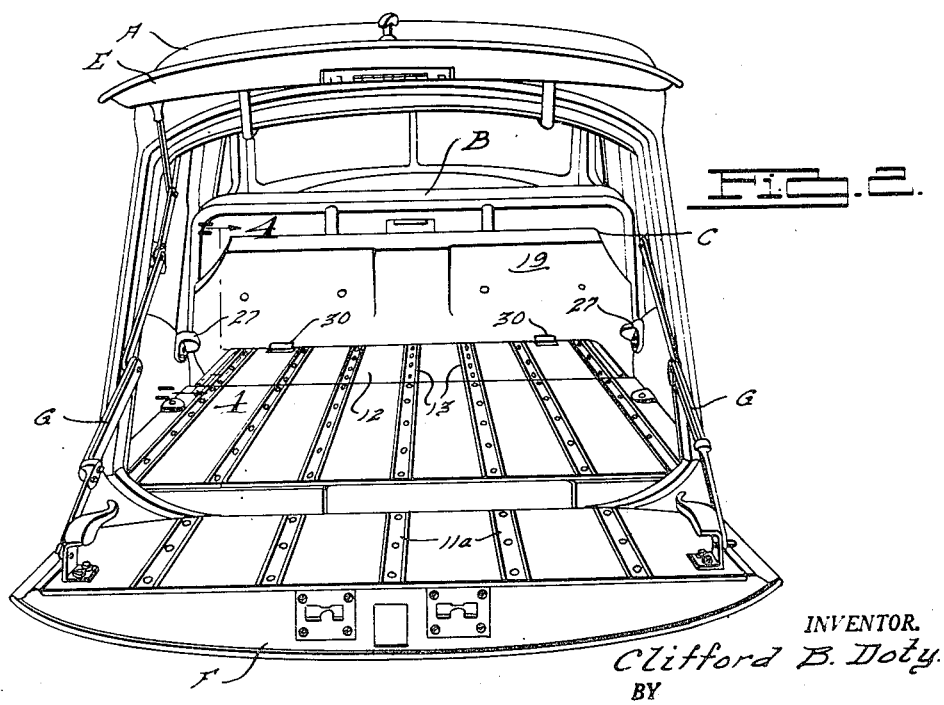

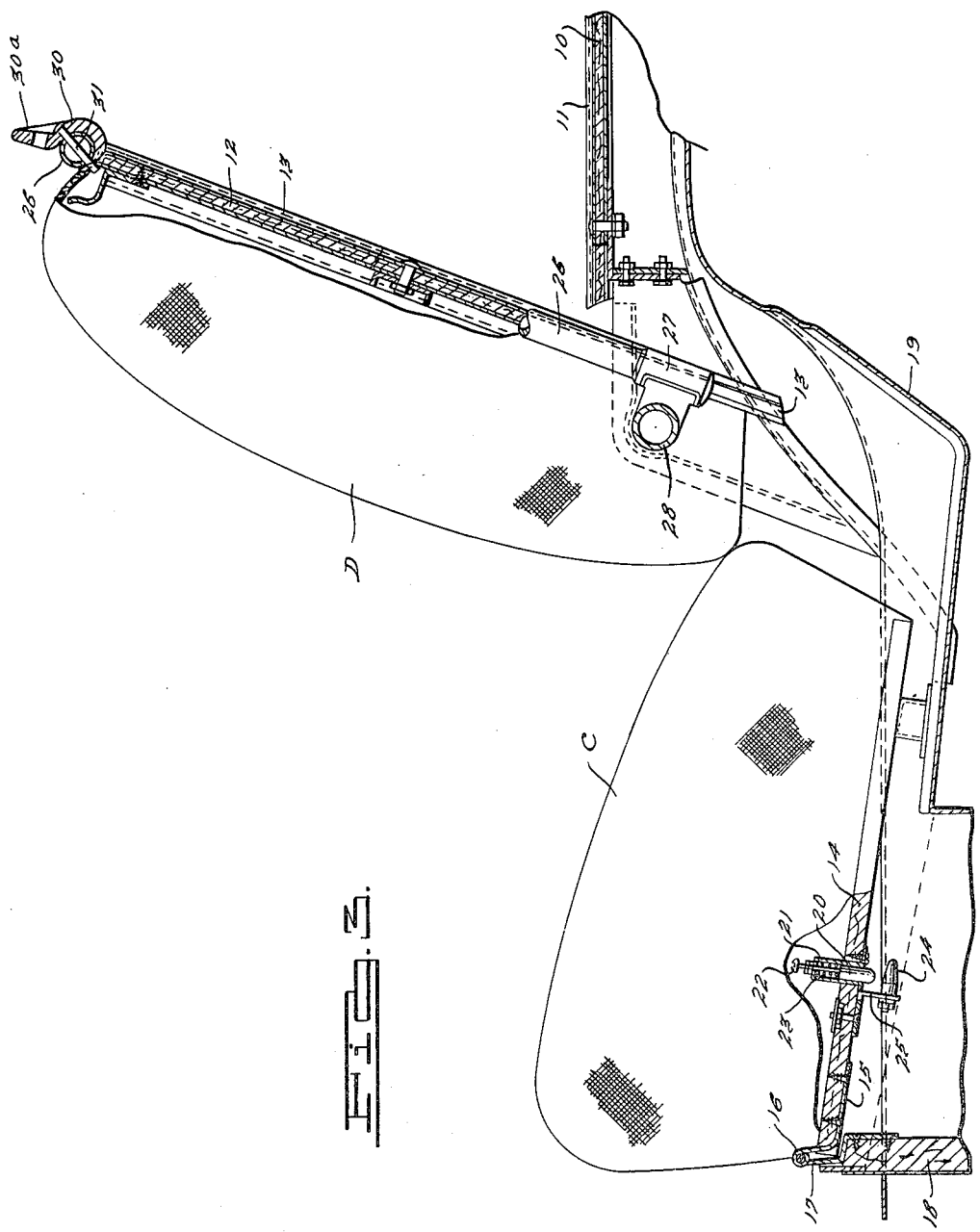

Patented July 8, 1952

2,602,691

UNITED STATES PATENT OFFICE 2,602,691

LATCH FOR PIVOTED CONVERTIBLE SEATS FOR VEHICLES

Clifford B. Doty, Detroit, Mich., assignor to Briggs Manufacturing Company, Detroit, Mich., a corporation of Michigan Application June 10, 1947, Serial No. 753,664

4 Claims. (Cl. 296—66)

This invention relates to vehicle bodies and particularly to the type of automobile body normally equipped with front and rear seats and a luggage compartment in rear thereof which is accessible either from within the tonneau of the vehicle or through an opening in the rear thereof adapted to be closed by a swinging deck lid or other closure means. Automobile bodies of this type are frequently termed station wagons. However, it will be understood that the present invention is not limited to vehicle bodies characterized as station wagons, since the invention has general applicability to automobile bodies of various types.

An object of the invention is to provide a vehicle body of the kind having a compartment within the tonneau behind the rear seat and wherein the size of the tonneau may be increased by manipulating the rear seat structure and utilizing a portion thereof as an extension of the deck or floor of the compartment.

A further object of the invention is to provide an improved seat structure comprising a pivoted seat back which may be swung forwardly and down to a position in which the rear of the seat back provides an extension of the deck or floor of the luggage compartment, thus increasing the size of the compartment.

Another object of the invention is to provide an improved seat structure comprising a seat cushion unit which may be swung forwardly into an upright position and a back cushion unit which may be swung forwardly and downwardly to occupy a substantial portion of the space normally occupied by the seat cushion, the construction being such that the back cushion unit when so manipulated is converted into an extension of the floor or deck of the luggage compartment which is increased in size substantially by the space occupied by the rear seat.

Still a further object of the invention is to provide releasable detent or latching means on the back cushion unit and seat cushion unit for holding these units in the positions in which they are moved when converting the back unit into an extension of the luggage compartment deck.

Other objects of this invention will appear in the following description and appended claims, reference being had to the accompanying drawings forming a part of this specification wherein like reference characters designate corresponding parts in the several views.

Fig. 1 is a rear end perspective view of a vehicle body embodying the present invention, this view showing the interior of the tonneau with the rear seat in its normal position.

Fig. 2 is a view similar to Fig. 1 but illustrating the rear seat shifted into position to form an extension of the deck or floor of the luggage compartment.

Fig. 3 is a side elevation, partly in section, of the rear seat in its normal position as shown in Fig. 1.

Fig. 4 is a side elevation, partly in section, illustrating the rear seat in converted condition, as shown in Fig. 2, to increase the size of the luggage compartment.

Fig. 5 is an enlarged section taken substantially through lines 5—5 of Fig. 4 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention as applied to an automobile body A having a tonneau open from front to rear and within which is installed a front seat B of any conventional construction. Also mounted within the tonneau of the vehicle is a rear seat which, as shown in Fig. 3, comprises a cushion seat unit C and a cushion back unit D. The seat and back units are shown in Fig. 3 in their normal positions for use in seating occupants of the vehicle. The rear of the vehicle body has an opening, as shown in Figs. 1 and 2, permitting access to the luggage compartment in rear of the back seat unit D. This opening may be closed by any suitable swinging deck lid, and in the present instance the closure means for the rear opening of the luggage compartment comprises an upwardly swinging deck lid E adapted to cooperate with a rearwardly swinging tail board F. The deck lid E and tail board F may be swung into position to close the rear opening of the vehicle body and, conversely, may be swung into the positions shown in Figs. 1 and 2 to permit easy access to the luggage compartment. The tail board F, when swung down into its horizontal position, is supported by means of check arms G. Since this construction forms no part of the present invention, a further description thereof is not deemed necessary.

The luggage compartment in rear of the upright back unit D of the rear seat has a floor or deck 10 of any suitable construction upon which are preferably secured a number of parallel skid strips 11 which may be in the form of shallow ribbed or channel-like metal strips. These skid strips 11 together with corresponding aligned skid strips 11a on the tail board F facilitate sliding baggage, luggage or other articles into and out of the luggage compartment.

The back unit D of the rear seat may largely be of conventional construction having a base frame carrying an upholstered spring cushion. Rigidly mounted upon the base frame of the back unit D is a floor or deck portion 12 preferably constructed similarly to the main deck or floor 10 of the luggage compartment, and rigidly secured to this floor or deck portion 12 of the seat back are a number of metal skid strips 13 similar and corresponding in number to the metal skid strips 11 and aligned therewith. Thus, it will be seen that the back of the rear seat back unit D is formed similarly to the main deck or floor of the luggage compartment so that when the back unit D is swung down to the position shown in Fig. 4 the floor portion 12 will form an extension of the floor 10 and the skid strips 13 will be aligned with the skid strips 11 and in substantially the plane thereof.

The cushion seat unit C is provided with a supporting base 14 to the front edge of which is secured a pair of transversely spaced bracket plates 15 which are bent upwardly and coiled at their front edges to form hinge members to receive transverse hinge or pintle pins 16. A pair of cooperating hinge members 17 are secured to an upright front seat support 18 rigidly attached to the metal floor pan 19 of the vehicle body. From this construction it will be seen that the seat unit C may be swung upwardly and forwardly about the transverse axis of the hinge or pintle pins 16 from its normal position shown in Fig. 3 to an upright position as shown in Fig. 4. Carried by the base 14 of the seat unit C adjacent each side thereof is a spring pressed detent 20 having its projecting end rounded or generally wedge shaped. Each detent is slidable within a tubular metal retainer 21 rigidly fastened to the base 14 of the seat unit. Threaded into the inner end of the detent 20 is an adjusting screw or bolt 22 which extends through an aperture in the inner end of the detent housing or retainer 21. Interposed between the detent 20 and the inner end of the casing 21 is a compression spring 23, this spring tending to force the detent outwardly to its position shown in Fig. 5 but permitting retraction of the detent against the action of the spring. The detent may be adjusted within the casing 21 through the medium of lock nuts 22a threaded onto the inner end of the adjusting bolt 22.

Located beneath the detent 20, in the position of the seat unit C shown in Fig. 3, is a locating or retainer pin 24 which is preferably wedge shaped or tapered at its end. This pin is rigidly secured to an angle bracket 25 fastened to the underside of the base frame 14 of the seat unit. As hereinafter described, this angle bracket 25 serves as a support for the front edge of the back unit D when it is swung down to its horizontal position.

The back unit D is preferably bordered by a marginal tubular frame 26 of generally U-shape construction which extends continuously around the sides and across the top of the back unit. Fastened at each side to the lower end of the tubular frame 26 is a bracket fitting 27 which carries a transverse trunnion member 28 pivoted to a cooperating trunnion member secured to the sides of the body A. By virtue of this construction it will be seen that the back unit D is hinged or pivoted adjacent the lower end thereof and at opposite sides to the wheel housings of the vehicle body, and as a result the back unit D is capable of swinging between the position shown in Figs. 3 and 4 about a transverse horizontal axis extending through the trunnions 28. Secured to the top horizontal portion of the frame 26 adjacent opposite ends thereof are a pair of keeper or bracket members 30. Each member partially embraces the tubular frame 26 and is rigidly fastened thereto by means of screws 31. The nose of each bracket member 30 is recessed at its top side and tapered to provide a detent engaging face 30a, and centrally of this tapered face the member 30 is provided with a transverse slot 32.

It will be understood that the seat unit C is provided on its underside with a pair of spring pressed detents 20 and associated parts, above described and as shown in Fig. 5, positioned in line with the bracket or keeper members 30. Accordingly, when converting the back of the rear seat of the vehicle into an extension of the rear deck 10 of the luggage compartment, the pair of brackets 30 will cooperate with the pair of detents 20 as well as with the spaced locating pins 24 and the angle supports 25. The manner in which this conversion is accomplished will be readily understood from a consideration of Figs. 3 and 4. The cushion seat unit C is first swung upwardly and forwardly about the hinge connection 16 from the position shown in Fig. 3 to the position shown in Fig. 4. Thereupon the back unit D is swung forwardly and downwardly about its pivotal or trunnion mountings 28 so as to occupy a generally horizontal position as shown in Fig. 4. When the back unit reaches substantially this position the nose 30a of each keeper member 30 will engage the rounded end of one of the detents 20, forcing it inwardly against its spring and thus permitting the nose portion 30a to pass beneath the detent and engage one of the angle brackets 25, as shown in Fig. 4. When this occurs the detent 20 will be projected rearwardly by the action of its spring, and by wedging action will draw down the nose portion 30a tightly against the bracket 25. At the same time the locating pins 24 will enter the slots 32 in the keeper or bracket members 30. From this construction it will be seen that the back unit D, in its converted horizontal position, will be firmly supported at its forward edge upon the angle brackets 25 and, in addition, will be releasably latched against displacement to the seat unit C through the medium of the spring pressed detents 20. The retainer or locating pins 24, in addition to positioning the back unit D in its proper horizontal position will also, through their cooperation with the keeper or bracket members 30, hold the seat unit C in its upright position. Thus, when the seat and back units C and D have been swung to their position shown in Fig. 4, the floor portion 12 will lie substantially in the same horizontal plane as the floor or deck 10 and will form an extension thereof, thus enlarging the size of the luggage compartment.

I claim:

1. In a vehicle body having a seat unit pivotally mounted to swing forward into an upright position and a back unit pivotally mounted to swing forward and downward into substantially a horizontal position, the combination of a bracket member mounted on the underside of the seat unit and a second bracket member mounted on the upper end of the back unit, said bracket members being interengageable in the forwardly swung positions of said units to support the latter thereat with the bracket member of the back unit overlying and supported on the bracket member of the seat unit, and means to wedge said interengaged bracket members together comprising a rearwardly inclined upper surface of the bracket member of the back unit, a plunger mounted on the seat unit for generally horizontal movement toward or from said inclined surface, and resilient means operatively disposed between the seat unit and plunger for yieldingly urging the latter into wedging engagement with said upper inclined surface to urge the back unit downward and seat unit forward.

2. In a vehicle body having a seat unit pivotally mounted to swing forward into an upright position and a back unit pivotally mounted to swing forward and downward into substantially a horizontal position, the combination of a bracket member mounted on the underside of the seat unit and a second bracket member mounted on the upper end of the back unit, said bracket members being interengageable in the forwardly swung positions of said units with a portion of the back unit bracket member overlying and supported on a portion of the seat unit bracket member and with another portion of the back unit bracket member disposed in advance of another portion of the seat unit bracket member to hold the latter against forward swinging, and means to wedge said interengaged bracket members together comprising a rearwardly inclined upper surface of the back unit bracket member, a generally horizontally movable plunger mounted on the seat unit, and resilient means disposed between the seat unit and plunger for yieldingly urging the latter into wedging engagement with said inclined upper surface.

3. In a vehicle body having a seat unit pivotally mounted to swing forward into an upright position and a back unit pivotally mounted to swing forward and downward into substantially a horizontal position, the combination of a pair of interengaging members, each comprising a bracket portion and being mounted on one of each of said units, the members being interengageable to support said units in their forwardly swung positions with the bracket portion of the back unit overlying the bracket portion of the seat unit and supported thereon, and means to wedge said interengaged bracket portions together comprising a rearwardly inclined cam surface on the bracket portion of one of said units, a plunger mounted on the other of said units for generally horizontal movement toward and from said inclined surface, and resilient means carried by said other unit and yieldingly urging the plunger toward the inclined surface into wedging engagement therewith.

4. In a vehicle body having a seat unit pivotally mounted to swing forward into an upright position and a back unit pivotally mounted to swing forward and downward into substantially a horizontal position, the combination of a pair of bracket members carried by the underside of said seat unit and the upper end of the back unit and interengageable in the forwardly swung positions of said units to support the back unit against downward swinging and to support the seat unit against swinging movement, and means to wedge said interengaged bracket members together comprising a rearwardly inclined cam surface on the bracket member of one of said units, a plunger mounted on the other of said units for generally horizontal movement toward and from said inclined surface, and resilient means carried by said other unit and yieldingly urging the plunger toward the inclined surface into wedging engagement therewith for yieldingly urging the interlocked bracket members of the back and seat units downward and forward respectively.

CLIFFORD B. DOTY.

REFERENCES CITED

The following references are of record in the file of this patent:

UNITED STATES PATENTS

| Number | Name | Date |
|---|---|---|
| 115,038 | Doyle et al. | May 23, 1871 |
| 556,853 | Leitch | Mar. 24, 1896 |
| 1,272,620 | Carlson | July 16, 1918 |
| 1,330,945 | Kuhn | Feb. 17, 1920 |
| 1,542,785 | Frick | June 16, 1925 |
| 1,796,081 | Bundy | Mar. 10, 1931 |
| 1,894,103 | Kuenzel | Jan. 10, 1933 |
| 2,152,505 | Stuart et al. | Mar. 28, 1939 |
| 2,254,193 | Augustine | Aug. 26, 1941 |

FOREIGN PATENTS

| Number | Country | Date |
|---|---|---|
| 107,131 | Australia | Apr. 20, 1939 |
| 694,578 | Germany | Aug. 3, 1940 |